United States Patent
Trachtman

(10) Patent No.: US 7,818,009 B2
(45) Date of Patent: Oct. 19, 2010

(54) CELLULAR CHANNEL ALLOCATION SCHEME WITH MULTI-USER DETECTION

(75) Inventor: Eyal Trachtman, London (GB)

(73) Assignee: Inmarsat Global Limited, London (GB)

( * ) Notice: Subject to any disclaimer, the term of this patent is extended or adjusted under 35 U.S.C. 154(b) by 1252 days.

(21) Appl. No.: 10/450,782

(22) PCT Filed: Dec. 14, 2001

(86) PCT No.: PCT/GB01/05521

§ 371 (c)(1),
(2), (4) Date: Dec. 30, 2003

(87) PCT Pub. No.: WO02/51186

PCT Pub. Date: Jun. 27, 2002

(65) Prior Publication Data

US 2005/0037764 A1    Feb. 17, 2005

(30) Foreign Application Priority Data

Dec. 19, 2000 (GB) ................................. 0030978.1

(51) Int. Cl.
*H04Q 7/20* (2006.01)
(52) U.S. Cl. ...................... 455/450; 455/443; 455/446; 455/447; 455/451
(58) Field of Classification Search ................. 455/443, 455/440, 444, 447, 448, 450, 446, 449, 451, 455/452.1, 455; 370/329, 330
See application file for complete search history.

(56) References Cited

U.S. PATENT DOCUMENTS

| | | | |
|---|---|---|---|
| 5,613,198 A * | 3/1997 | Ahmadi et al. | 370/337 |
| 5,867,478 A * | 2/1999 | Baum et al. | 370/203 |
| 5,946,625 A | 8/1999 | Hassan et al. | |
| 6,020,847 A * | 2/2000 | Upton et al. | 342/357.16 |
| 6,055,432 A * | 4/2000 | Haleem et al. | 455/452.1 |
| 6,069,885 A | 5/2000 | Fong et al. | |
| 6,188,903 B1 * | 2/2001 | Gardner et al. | 455/447 |
| 6,212,387 B1 * | 4/2001 | McLaughlin et al. | 455/450 |
| 6,553,234 B1 * | 4/2003 | Florea | 455/447 |
| 6,674,739 B1 * | 1/2004 | Lee et al. | 370/342 |
| 6,680,928 B1 * | 1/2004 | Dent | 370/342 |
| 6,697,344 B1 * | 2/2004 | Carrozza et al. | 370/316 |
| 6,754,499 B1 * | 6/2004 | Smith | 455/450 |
| 6,792,276 B1 * | 9/2004 | Butovitsch et al. | 455/453 |
| 6,892,068 B2 * | 5/2005 | Karabinis et al. | 455/429 |

(Continued)

FOREIGN PATENT DOCUMENTS

CA     2201460      10/1998

(Continued)

*Primary Examiner*—Tuan A Pham
(74) *Attorney, Agent, or Firm*—Sterne, Kessler, Goldstein and Fox PLLC

(57) ABSTRACT

In a spectrum allocation method in a cellular communication system, a cell pattern is divided into clusters each containing a plurality of adjacent cells. A pool of forward and return link bearers is allocated to each cluster and may be shared among cells within the cluster. Bearers are reused between blusters having a sufficiently high mutual isolation. Preferably, the same time slot in a return link bearer is allocated to multiple users within the cluster. The receiver of the shared return link bearer uses multi-user detection techniques to separately decode the signals from each user sharing a time slot, using the spatial diversity of the individual cells.

35 Claims, 6 Drawing Sheets

U.S. PATENT DOCUMENTS

| | | | |
|---|---|---|---|
| 6,922,546 B1 * | 7/2005 | Da et al. | 455/12.1 |
| 2001/0012276 A1 * | 8/2001 | Tsunehara et al. | 370/318 |
| 2002/0037737 A1 * | 3/2002 | Learned et al. | 455/526 |
| 2002/0111163 A1 * | 8/2002 | Hamabe | 455/425 |
| 2002/0168973 A1 * | 11/2002 | Dent et al. | 455/427 |
| 2004/0038682 A1 * | 2/2004 | Persson et al. | 455/436 |
| 2005/0265273 A1 * | 12/2005 | Karabinis et al. | 370/316 |

FOREIGN PATENT DOCUMENTS

| | | |
|---|---|---|
| WO | WO91/01073 | 1/1991 |

* cited by examiner

CELLULAR CHANNEL ALLOCATION SCHEME WITH MULTI-USER DETECTION

FIELD OF THE INVENTION

The present invention relates to a method and apparatus for spectrum allocation and channel reception in a cellular mobile communications system.

BACKGROUND OF THE INVENTION

Maximising spectrum utilisation has been a prime goal in the design of modern mobile satellite systems in recent years. The spectrum allocated to Mobile Satellite Service (MSS) is a limited resource and needs to be shared among competing satellite system operators. Therefore maximising spectrum utilisation and frequency reuse have become a major consideration in the design of modern MSS constellations. Another major consideration is dimensioning of user terminals, with a drive for progressively smaller and more compact terminals.

In order to accommodate both considerations the MSS satellite designs have become progressively more complex, utilising a large number of spot beams, effectively overlaying the satellite coverage area with a large array of cells on the ground. Smaller spot beams increase the satellite power concentrated in a cell and therefore allow for smaller user terminals. A larger number of spot beams and corresponding cells in the coverage area allows for more effective spectrum utilisation and for higher frequency reuse factors to be achieved, since a carrier frequency may be re-allocated in nearby beams, provided that adequate isolation is achieved between those beams, thereby limiting inter-cell interference to an acceptable level.

Multi-User Detection (MUD) is another technological advancement that could contribute to maximising spectrum utilisation. Originally MUD techniques were developed for Code Division Multiple Access (CDMA), utilising the discrimination in the signal code space for detecting individual user signals in a simultaneous reception of multi-user signals. Recent developments in MUD have found solutions for discriminating and detecting individual signals in a simultaneous reception of multi-user signals where those signals are not CDMA coded; see for example CA-A-2201460 which discloses a technique which relies on forward error correction (FEC). The paper 'Multiuser Decoding for Multibeam systems' by M. Moher, IEEE Transactions on Vehicular Technology, July 2000, Volume 49, Number 4 discloses a technique which exploits other diversity dimensions, such as signal reception diversity through more than one transmission path; the same spectrum is allocated to all beams in a multibeam satellite or terrestrial cellular system.

Recent satellite systems incorporate position location capabilities in the user terminal, utilising Global Positioning System (GPS) receivers or alternative global navigation satellite system (GNSS) receivers. A Time Division Multiple Access (TDMA) system may use the knowledge of user terminal position in optimising system performance and economising resources allocated to the user. One area of economising is in allowing new users to log on to the system in a narrow time window by making use of the precise position and time determination capabilities of GNSS systems such as GPS.

The radio resource management (RRM) in a packet data system may include allocation of shared bearers to cells (which are served by spot beams in a satellite system) in response to aggregate capacity requests from users in the cells. Bearer allocation is based on a frequency plan that aims to maximise frequency reuse in the spectrum constraints of the system. In reusing a bearer frequency between cells the frequency plan takes into account the required isolation between cells to maintain interference; at an acceptable level.

In a terrestrial cellular system, the frequency plan may be implemented at a mobile switching centre, which is connected to base stations having RF transmitters and receivers which define the cell pattern of the system. The mobile switching centre stores frequency plan data and allocates channels to user terminals in accordance with the frequency plan and demand for channels by the user terminals.

In a multibeam satellite system, the frequency plan may be implemented on a satellite, or by one or more ground stations if the satellites are 'dumb' or repeater satellites. For example, in the Inmarsat™ systems channel allocation may be performed by a Land Earth Station (LES) or Network Coordination Station (NCS).

Two examples of frequency reuse patterns for bearer frequencies are shown in FIG. 1 and FIG. 2.

FIG. 1 shows a frequency reuse pattern in a 5-cell array. Bearer frequencies are reused between cells 1 and 5 and between cells 2 and 4, taking advantage of the isolation between those cells.

FIG. 2 shows a frequency reuse pattern in a large cellular array, in which one hexagonal 7-cell cluster is highlighted. The cells within each cluster are numbered from 1 to 7. Given that the required separation distance S between cell centres (for achieving required isolation and limiting interference) is $\sqrt{7}D$, where D is the distance between adjacent cell centres, a 7-cell reuse pattern can be applied, allowing for a bearer frequency to be used once in any hexagonal 7-cell cluster, and resulting with a reuse factor of $\frac{1}{7}$. Alternatively, clusters of 3, 4, 6, 19 or other numbers of cells may be used, depending on the required separation distance D.

The radio resource management (RRM) in a packet data system may also include allocation of return link shared bearer time slots to users in corresponding cells. Users in a given cell are allocated time slots in the shared bearer serving that cell, for example by transmitting an allocation message to a user terminal defining the frequency and time slot to be used by that user terminal. Initial access channels, which are typically used by terminals to establish contact with the system and to transmit a channel allocation request, may have a fixed frequency and time slot known a priori by the mobile terminal or a variable frequency and time slot indicated on a fixed channel, such as a bulletin board channel.

Examples of time slot allocation methods are:
a. allocation on an exclusive basis (i.e. a given time slot is dedicated to one user);
b. allocation on contention basis (i.e. more than one user may use a given time slot). A contention channel is normally not loaded more than 10% in order to limit probability of collisions to an acceptable level;
c. use of an initial access channel, where a relatively long time slot is required due to time uncertainty at the user terminal. Access through this channel is also subject to probability of collisions between competing packets trying to use the same time slot for initial access.

FIG. 3 illustrates the time slot allocation function in the case of adjacent cells c1 and c2 with corresponding shared bearers f1 and f2. Users u1, u2 in c1 are allocated exclusive time slots f1-T1, f1-T2. Users u3, u4 are allocated contention time slot f1-Tc. Users u5, u6 are attempting initial access using time slot f1-TA. Similarly users in cell c2 are using exclusive, contention and initial access time slots in shared bearer f2.

The shared bearer frequencies allocated to the cells may be reused in the cell array in keeping with the isolation requirements for limiting inter-cell interference.

The document WO 91/01073 describes a cellular radio system in which each cell may be subdivided into a pair of sectors with carriers being shared between the pair of sectors.

STATEMENT OF THE INVENTION

In accordance with one aspect of the present invention, there is provided a spectrum allocation method in a cellular communication system, in which a cell pattern is divided into clusters each containing a plurality of cells having low inter-cell isolation. A pool of forward and return link bearers is allocated to each cluster and may be shared among cells within the cluster. Bearers are reused between clusters having a sufficiently high mutual isolation.

This clustering arrangement allows a significantly higher reuse factor than the traditional method of allocating bearers to individual cells and reusing bearers between individual cells having sufficiently high mutual isolation.

Preferably, different time slots in a return link bearer are allocated to different user terminals within the corresponding cluster. Most preferably, the same time slot in a return link bearer may be allocated to one user within each cell of the cluster. The receiver of the shared return link bearer may use multi-user detection techniques to separately decode the signals from each user terminal sharing a time slot, using the spatial diversity of the individual cells.

Preferably, the user terminals may receive relative timing and/or position information and adjust the timing of their transmissions so as to synchronise their transmissions to a reference timing at a receiver. This allows initial access time slots to be shortened.

BRIEF DESCRIPTION OF THE DRAWINGS

Specific embodiments of the present invention will now be described with reference to the accompanying drawings, in which.

MODES FOR CARRYING OUT THE INVENTION

Figure 1:
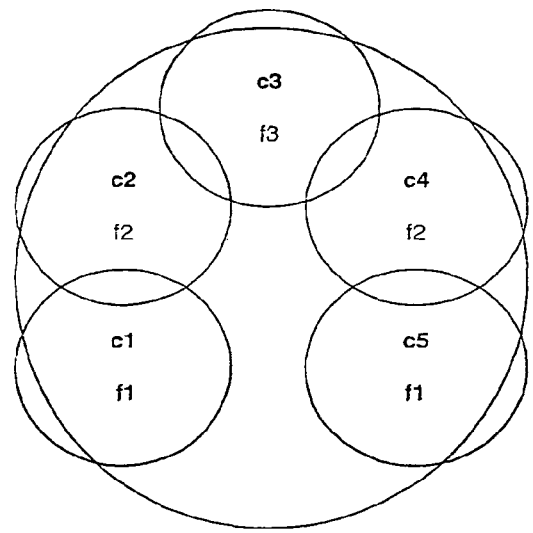
FIG. 1 is a diagram of a conventional frequency reuse pattern in a five-cell array.
Figure 2:
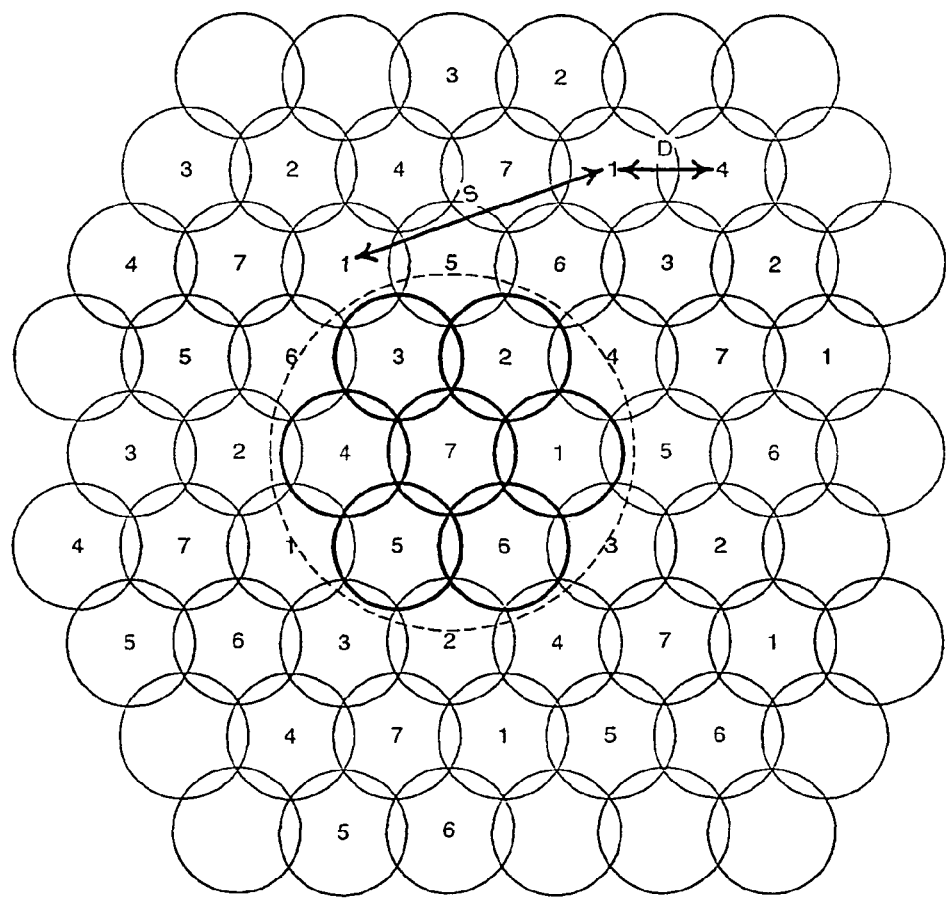
FIG. 2 is a diagram of a conventional frequency reuse pattern in a large cell array.
Figure 3:
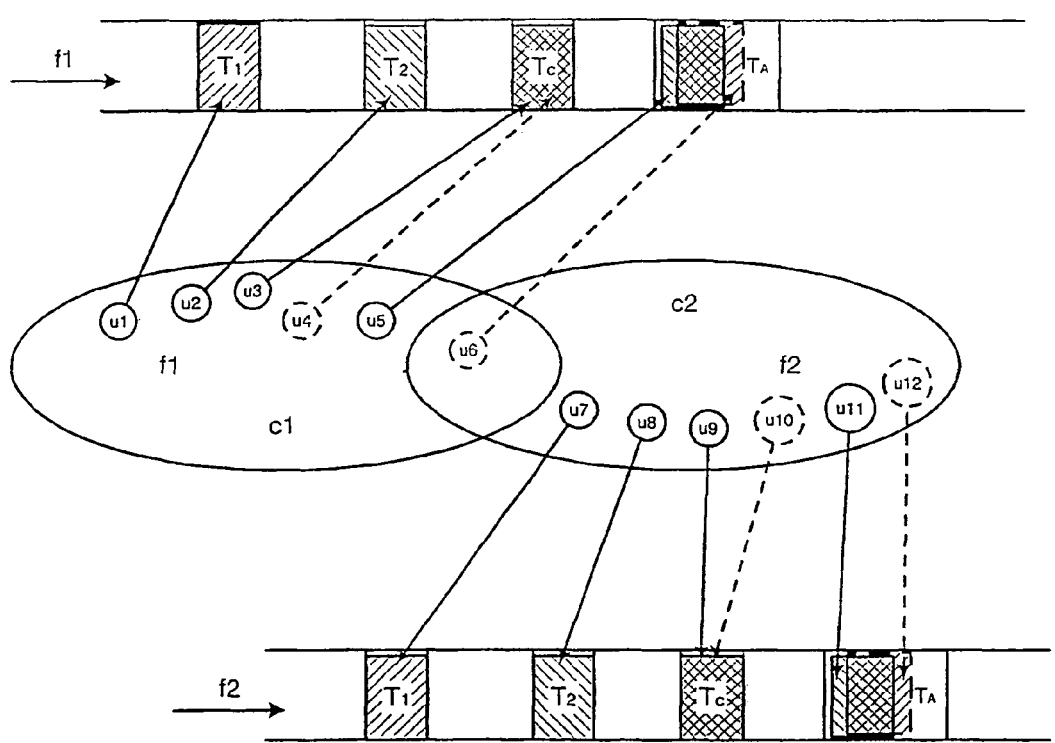
FIG. 3 is a diagram of a conventional time slot allocation scheme.
Figure 4:
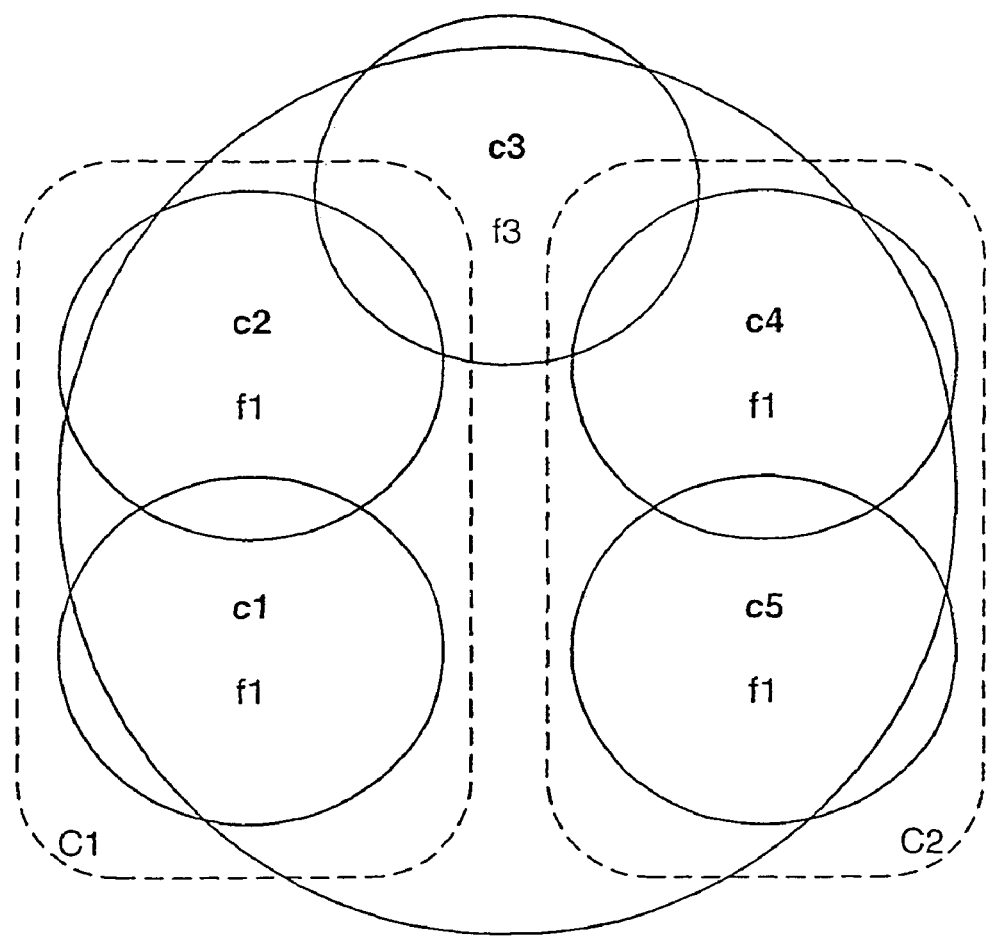
FIG. 4 is a diagram of a frequency reuse pattern in a five-cell array in an embodiment of the present invention.

Embodiments of the present invention involve sharing a common pool of bearers within a cluster of overlapping cells i.e. cells having a low isolation with respect to another cell in the cluster. As shown in FIG. 4, cells c1 and c2 form one two-cell cluster C1 and share a bearer frequency f1, cells c4 and c5 form another two-cell cluster C2 and share the bearer frequency f1, the two clusters being substantially separate so that any interference between the two clusters within the bearer frequency f1 is below a given acceptable level. Hence, a higher frequency reuse is possible than in the conventional example shown in FIG. 1. A cell c3 overlaps both clusters and is allocated a different bearer frequency f3.

Figure 5:
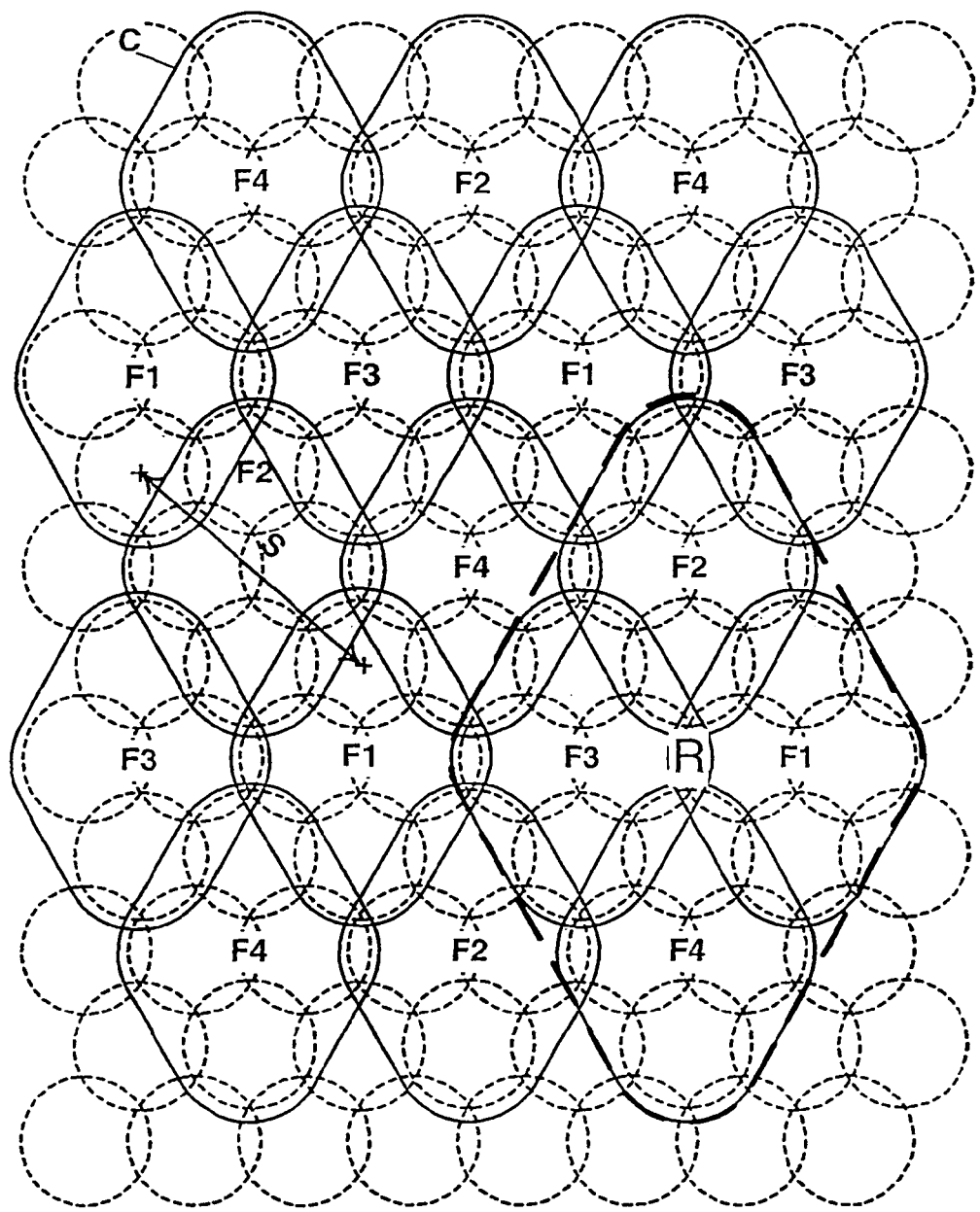
FIG. 5 is a diagram of a frequency reuse pattern in a large cell array in an embodiment of the present invention.

As shown in FIG. 5, the large cell array is divided into four-cell clusters C, and a diamond-shaped four-cluster reuse pattern R is defined for four bearer frequencies F1, F2, F3 and F4. The separation distance S between the centres of cells in different clusters is √7D, as in the conventional example, where D is the distance between centres of adjacent cells. However the frequency reuse factor (number of frequencies/number of cells) is ¼, compared to ⅐ in the conventional example.

Figure 6:
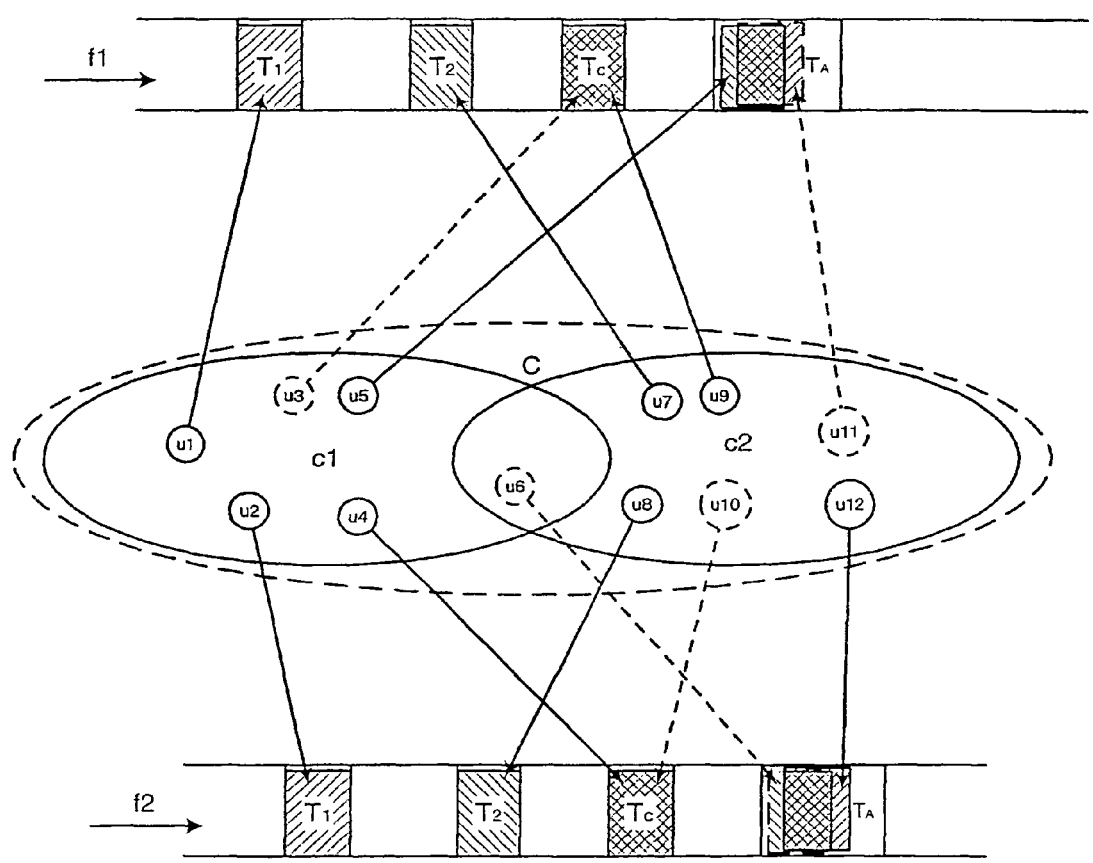
FIG. 6 is a diagram of a time slot allocation scheme in a first embodiment of the present invention.

FIG. 6 shows allocation of time slots to user terminals at frequencies f1 and f2 of a frequency pool shared within a two-cell cluster C in a first embodiment of the present invention. The time slots include uniquely assigned time slots T1 and T2, contention-based time slots Tc and initial access time slots Ta. User terminals u1 and u2 in cell c1 are allocated slot T1 at frequencies f1 and f) respectively. User terminals u3 and u4 are allocated the contention time slot Tc at frequencies f1 and f2 respectively. User terminals u5 and u6 attempt initial access in the initial access slot Ta in frequencies f1 and f2 respectively. Likewise, user terminals u7 to u12 use exclusive, contention-based and initial time slots at the frequencies f1 and f2.

As well as giving improved frequency reuse, the sharing of a pool of frequencies within a cluster gives greater flexibility in the loading of each bearer according to capacity demand from all the user terminals in the cluster, rather than from user terminals within each cell, thereby reducing inefficient capacity allocation due to partially loaded bearers.

A possible disadvantage of frequency sharing within a cluster is the significantly higher number of sub-channels per cell, by a factor of the number of cells per cluster. This may require additional complexity in a multi-beam satellite or cellular base station using this scheme. The satellite will also require a greater feeder link capacity corresponding to the increased total number of sub-channels in use.

Another disadvantage is that a larger time slot is required in an initial access channel, because user terminals attempting to use the channel may be distributed across the whole cluster rather than just one cell, giving greater timing uncertainty. However, this disadvantage may be overcome by the user terminals applying a timing adjustment to transmissions in the initial access channel, based on their position. In that case, the user terminals may include positioning (e.g. GPS or GNSS) receivers for determining their position, a data store containing information on the positions of the clusters and means for calculating a transmission timing offset as a function of the distance of the user terminal from the cluster centre.

A greater improvement in the efficiency of spectrum use is obtained in a second embodiment of the present invention, in which return link time slots in each bearer may be simultaneously assigned to one user terminal in each cell of a cluster. If there are n cells per cluster, each time slot of each shared bearer may support up to n simultaneous users. A receiver of the transmissions in each time slot receives a signal from each cell, each signal comprising up to n overlapping transmissions. Using the differences between the signals received from the different cells and applying multi-user detection techniques, the receiver separates and decodes each of the overlapping signals. Successful separation and decoding of the overlapping signals requires that the receiver is capable of separating the necessary number it of overlapping signals.

The technique of the second embodiment is applicable to unique timeslot allocation, except that the time slot is only exclusively assigned to a user terminal the extent that transmissions from that terminal can be separated by the receiver from transmissions from other user terminals; for example, the time slot is exclusively assigned only within an individual cell within the cluster.

In contention-based allocation, a significantly higher capacity loading is permitted on a contention channel, since up to n users can transmit simultaneously in the same slot, dependent on their distribution among the cells within a cluster. Contention channel loading is limited by the need to ensure an acceptably low probability of more than n user terminals transmitting in the same time slot.

In an initial access channel, a larger time slot is required as in the first embodiment, but up to it user terminals can use the time slot simultaneously, so greatly increasing the acceptable capacity loading. Transmission timing adjustment may be performed by the user terminals instead of increasing the time slot size, as in the first embodiment.

In the second embodiment each shared bearer can be loaded up to n times that of a shared bearer in the first embodiment and is therefore n times more efficient. Therefore the spectrum requirement for a given capacity is reduced by a factor of n.

Moreover, the disadvantage of an n-fold increase in the number of sub-channels per shared bearer in the first embodiment is fully compensated for in the second embodiment by an n-fold reduction in the average number of shared bearers per cell and per cluster. The only penalty in complexity is the requirement for multi-user detection at the receiver.

Figure 7:
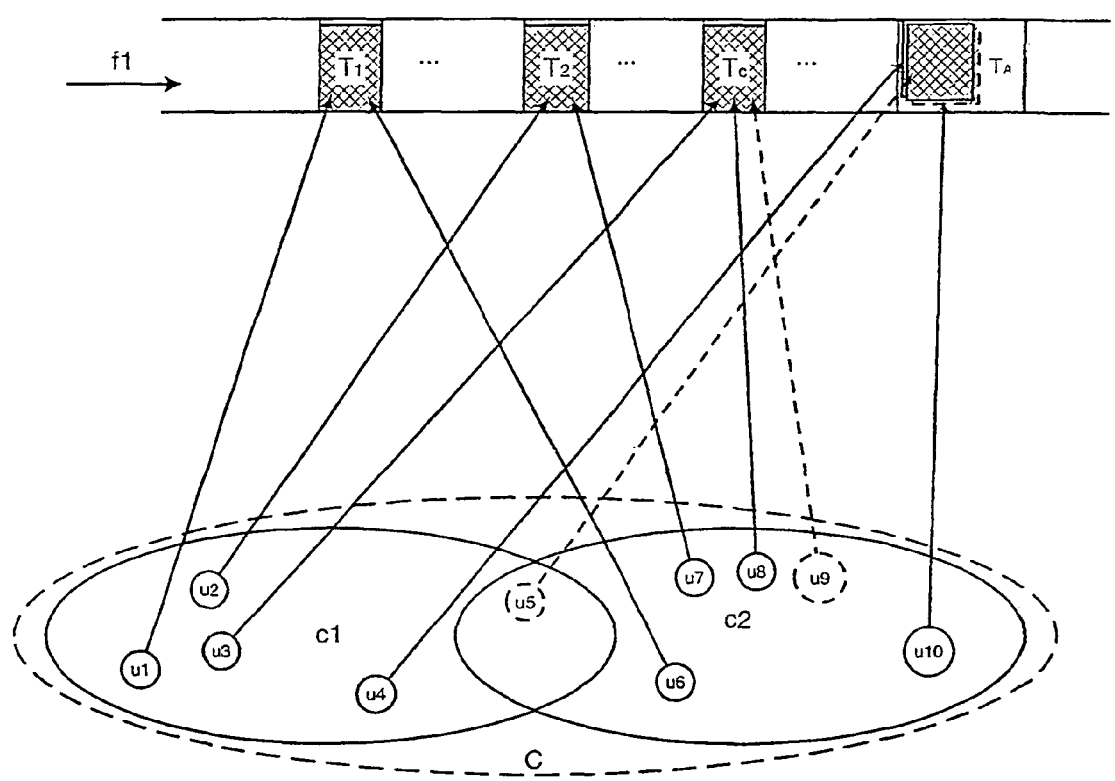
FIG. 7 is a diagram of a time slot allocation scheme in a second embodiment of the present invention.

FIG. 7 shows a time slot allocation scheme in the second embodiment with a cluster of two cells c1 and c2, a shared bearer pool F including frequency f1 and a TDMA receiver capable of simultaneous detection of two user terminals. User terminals u and u2 in cell c1 are allocated unique time slots T1 and T2 respectively, as are user terminals u5 and u6 in c2. User terminals u3 in cell C1 and u5 and u9 in cell c2 are allocated the contention time slot Tc. User terminals u4 and u5 in cell c1 and user terminal u10 in c2 attempt initial access in time slot Ta.

Provided that two user terminals are not collocated, there will be different reception properties for the two terminals in different diversity paths. Hence, multi-user detection techniques may use the different diversity reception properties to separate signals from the two user terminals, even if they are nominally in the same cell, because the signals will also be received with a lower signal strength in adjacent cells.

The present invention is applicable to different types of cellular communication system and is not limited to satellite or terrestrial cellular embodiments. Moreover, the present invention is not limited to TDMA but may also be applied to other multiple access schemes.

The invention claimed is:

1. A method of channel allocation in a cellular communications system, including the steps of:
   a. allocating a common channel to a plurality of user terminals within a cluster of n adjacent cells, without allocating said common channel to user terminals in other cells adjacent to said cluster, wherein each cell of a group of three cells within said cluster is adjacent to each other cell of said group of three cells;
   b. receiving a respective plurality of temporally overlapping transmissions within said common channel from said plurality of user terminals in the same cell or adjacent cells within the cluster; and
   c. separately decoding each of said plurality of overlapping transmissions by means of a multi-user detection technique,
   wherein said common channel comprises a plurality of m timeslots within a bearer, and in each of said m time slots, up to n user signals for n cells are transmitted, such that said common channel supports up to n*m transmissions.

2. A method according to claim 1, wherein said plurality of temporally overlapping transmissions are received over a plurality of spatially diverse paths.

3. A method according to claim 2, wherein step b includes receiving two of said transmissions from within the same cell within the cluster.

4. A method according to claim 1 or claim 2, wherein step a includes allocating said common channel to one of said user terminals in each of the cells within the same cluster.

5. A method according to claim 4, wherein said plurality of temporally overlapping transmissions are received from within a respective plurality of said cells within the cluster.

6. A method according to any one of claims 1 to 3, wherein said common channel is a dedicated channel.

7. A method according to any one of claims 1 to 3, wherein said common channel is a contention-based access channel.

8. A method according to any one of claims 1 to 3, wherein said common channel is an initial access channel.

9. A method of channel allocation in a cellular communications system, including the steps of:
   a. determining a cell clustering pattern in which cells are grouped together into a plurality of clusters of n adjacent cells, each cluster containing a similar number and arrangement of adjacent cells, wherein each cell of a group of three cells within a cluster is adjacent to each other cell of said group of three cells;
   b. allocating a plurality of channels to said clusters such that each said channel is allocated only to non-adjacent clusters; and
   c. allocating the same one of said channels to each of a plurality of user terminals within the same or adjacent cells of the same cluster such that each of said plurality of user terminals is permitted to transmit at overlapping times within the same channel,
   wherein the same one of said channels comprises a plurality of m timeslots within a bearer, and in each of said m time slots, up to n user signals for n cells are transmitted, such that said channel supports up to n*m transmissions.

10. A method according to claim 9, wherein step c includes allocating said same one of the channels to one of said user terminals in each of the cells within the same cluster.

11. A method according to claim 9 or 10, including receiving a plurality of temporally overlapping transmissions from each of said plurality of user terminals on said allocated channel, and separately decoding each of said transmissions.

12. A method according to claim 11, wherein said plurality of temporally overlapping transmissions are received over a plurality of spatially diverse paths.

13. A method according to claim 11, including receiving two of said transmissions from within the same one of said cells.

14. A method according to claim 11, wherein said plurality of temporally overlapping transmissions are received from within a respective plurality of said cells within the same one of said clusters.

15. A method according to claim 11, wherein said separate decoding is performed using a multi-user detection technique.

16. A method according to any one of claims 1 to 3, 9, and 10, wherein each of said plurality of terminals receives timing reference signals and adjusts the timing of its transmission in accordance with said timing reference signals so as to be received in synchronism with the others of said plurality of terminals.

17. A method according to claim 16, wherein said timing reference signals comprise navigation signals transmitted by a constellation of satellites.

18. A method according to any one of claims 1 to 3, 9, and 10, including receiving allocation request signals from said plurality of terminals, said channel being allocated to said plurality of terminals in response to said allocation request signals.

19. A method according to claim 9 or 10, wherein said same one of said channels is a dedicated channel.

20. A method according to claim 9 or 10, wherein said same one of said channels is a contention-based access channel.

21. A method according to claim 9 or 10, wherein said same one of said channels is an initial access channel.

22. A method according to any one of claims 1 to 3, 9, and 10, wherein said cellular communications system is a satellite communications system having multiple beams respectively defining said cells.

23. Apparatus arranged to perform a method according to any one of claims 1 to 3, 9, and 10.

24. A satellite including apparatus according to claim 23.

25. A satellite earth station including apparatus according to claim 23.

26. A method according to any one of claims 1 to 3, 9, and 10, wherein said system is a terrestrial cellular communications system.

27. Apparatus arranged to perform the method of claim 26.

28. A mobile switching centre including apparatus according to claim 27.

29. A method of channel allocation in a cellular communications system, including the steps of:

a. allocating a common channel to a plurality of user terminals within a cluster of n adjacent cells, without allocating said common channel to user terminals in other cells adjacent to said cluster, wherein each cell within said cluster is adjacent to each other cell of said cluster;

b. receiving a respective plurality of temporally overlapping transmissions within said common channel from said plurality of user terminals in the same cell or adjacent cells within the cluster; and c. separately decoding each of said plurality of overlapping transmissions by means of a multi-user detection technique, wherein said common channel comprises a plurality of m timeslots within a bearer, and in each of said m time slots, up to n user signals for n cells are transmitted, such that said common channel supports up to n*m transmissions.

30. A method according to claim 29, wherein said plurality of temporally overlapping transmissions are received over a plurality of spatially diverse paths.

31. A method according to claim 30, wherein step b includes receiving two of said transmissions from within the same cell within the cluster.

32. A method according to claim 29 or claim 30, wherein step a includes allocating said common channel to one of said user terminals in each of the cells within the same cluster.

33. A method according to claim 32, wherein said plurality of temporally overlapping transmissions are received from within a respective plurality of said cells within the cluster.

34. A method according to any one of claims 29 to 31, wherein said common channel is dedicated channel.

35. A method according to any one of claims 29 to 31, wherein said common channel is a contention-based access channel.

* * * * *